United States Patent [19]

Wheatley

[11] Patent Number: 5,301,913

[45] Date of Patent: Apr. 12, 1994

[54] MOUNTING CLAMP FOR PICK-UP TRUCK BEDS

[76] Inventor: Donald G. Wheatley, 4451 Ford Rd., Ann Arbor, Mich. 48105

[21] Appl. No.: 10,852

[22] Filed: Jan. 29, 1993

[51] Int. Cl.⁵ ............................................. A47B 96/06
[52] U.S. Cl. .................. 248/231.4; 248/228
[58] Field of Search ............... 248/231.4, 235.5, 228; 24/525, 522, 569, 514, 590; 296/39.2; 224/42.45 R

[56] References Cited

U.S. PATENT DOCUMENTS

| | | | |
|---|---|---|---|
| 2,893,677 | 7/1959 | Dannenburg | 248/228 |
| 2,905,665 | 9/1959 | Borodin | 248/228 X |
| 4,796,942 | 1/1989 | Robinson | 296/39.2 |
| 4,901,963 | 2/1990 | Yoder . | |
| 4,934,572 | 6/1990 | Bowman | 224/42.45 R |
| 5,052,737 | 10/1991 | Farmer | 24/514 X |
| 5,118,156 | 6/1992 | Richard | 248/231.4 X |
| 5,131,780 | 7/1992 | Love . | |
| 5,150,940 | 9/1992 | Kennedy | 296/39.2 |

FOREIGN PATENT DOCUMENTS

| | | | |
|---|---|---|---|
| 562865 | 10/1932 | Fed. Rep. of Germany | 248/231.4 |
| 398911 | 3/1966 | Switzerland | 248/231.4 |

*Primary Examiner*—J. Franklin Foss
*Attorney, Agent, or Firm*—Harness, Dickey & Pierce

[57] ABSTRACT

A clamp for use in attaching a cap or other accessory to the bed of a pickup truck comprising a receiving member forming a receiving pocket and a received member having a leg insertable into the pocket of the receiving member. The received leg is contacted on both sides by the receiving pocket to maintain alignment of the two members to keep the clamping surfaces parallel to one another. Single point contact is provided between the received leg and the walls of the pocket to reduce friction. The two sided contact with the received leg eliminates bending stress in the attaching bolt.

27 Claims, 2 Drawing Sheets

MOUNTING CLAMP FOR PICK-UP TRUCK BEDS

BACKGROUND AND SUMMARY OF THE INVENTION

The present invention relates to a mounting clamp and in particular to a mounting clamp for attaching accessories such as a pick-up truck cap to the bed of a pick-up truck.

Several clamps have been developed for use in securing accessories such as a pick-up truck cap, a tonneau cover, a cab spoiler, bed rails, etc., to a pick-up truck bed. One type of truck bed clamp includes two clamping parts pivotally connected to one another and adjustable by a threaded bolt. However, depending upon the thickness of the parts being clamped together, the two clamping surfaces may not be parallel to one another in the clamped position, compromising the clamping strength. This is due to the relative rotation of the clamp parts.

The disadvantage of pivotally connected clamp parts has been overcome by another clamp that provides two parts having a pair of engaging surfaces. During adjustment of the clamp, the two parts slide relative to one another along the engaging surfaces to securely fasten items to the truck bed. The sliding motion between parts allows the clamping surfaces to remain parallel to one another over a range of material thicknesses being clamped together. However, with such a clamp having only one pair of engaging surfaces between the two parts, the bolt used to hold the clamp parts together experiences high bending loads in addition to the tensile loads necessary to produce the clamping load.

Accordingly, it is an object of the present invention to provide an improved truck bed clamp configured to avoid bending loads in the attaching bolt and to maintain the clamping surfaces parallel to each other.

It is a feature of the clamp of the present invention to provide two clamp members in which one member is formed with a pocket into which a leg of the other member is slidably received. The result is two pairs of engaging surfaces between the two members which enables the received leg to be contacted on two sides by the receiving member. Contact on both sides of the received leg enables the internal bending moment in the clamp to be carried by the clamp members themselves rather than being carried through the securing bolt.

It is a further feature of the clamp of the present invention that the contact between the engaging surfaces is in the form of point contact rather than surface to surface contact. This results in less friction between the members. To further reduce the friction, the contact points are formed by bushings made of ultra-high molecular weight polyethylene which is self lubricating. When clamping loads are applied to the clamp members, resulting in internal bending stresses, the low friction between the clamp members facilitates relative movement of the clamp members.

It is a further feature of the clamp of the present invention that one or both of the clamping surfaces are formed with rubber bushings to avoid damage to the surfaces engaged by the clamp.

The two clamp members are attached to one another by a bolt slidably carried by one member and threadably received by the other. In a preferred embodiment of the clamp, the two clamp members are made of extruded aluminum. To provide increased strength to the threaded bolt attachment, a captured nut is mounted to the member receiving the bolt and both the bolt and the nut are made of steel. Steel has greater strength than the extruded aluminum for a threaded attachment.

One or both of the clamp members can be formed with means for mounting additional accessories to the clamp itself separate from the accessory mounted to the truck bed between the two clamping surfaces of the clamp members.

Further objects, features and advantages of the invention will become apparent from a consideration of the following description and the appended claims when taken in connection with the accompanying drawings.

DETAILED DESCRIPTION OF THE INVENTION

Figure 1:
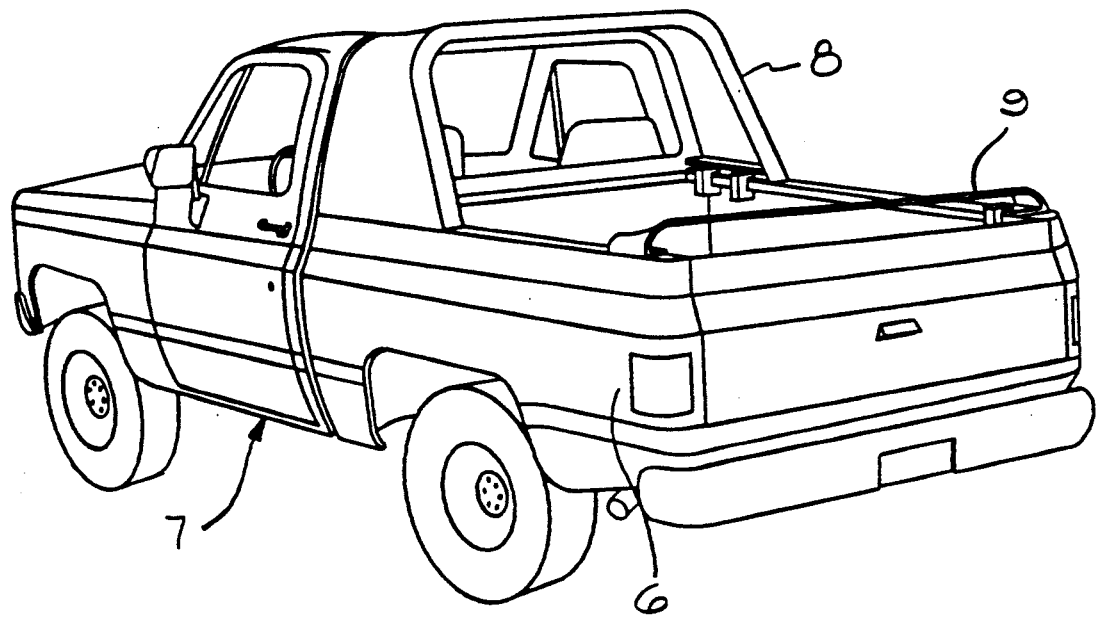
FIG. 1 is a perspective view of a pick-up truck showing the clamp of the present invention being used to attach accessories to the truck bed.

The truck bed clamp 10 of the present invention is shown in FIG. 1 in use attaching accessories to the bed 6 of pick-up truck 7. The clamps 10 are used to attach a cab spoiler 8 and a rear wing 9 to the truck bed. Other accessories such as a truck cap, tonneau cover etc., can be attached to the truck bed with clamps 10.

Figure 2:
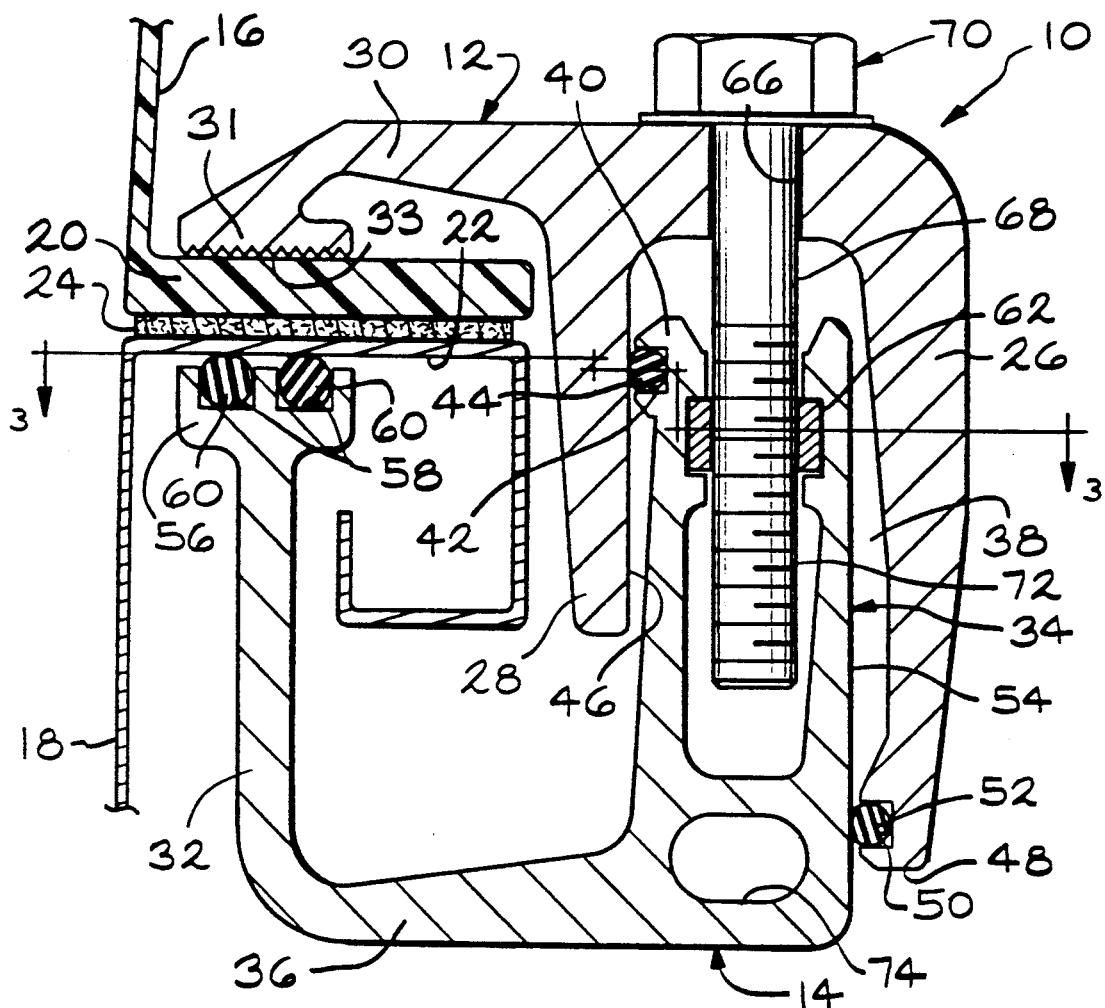
FIG. 2 is a vertical sectional view of one embodiment of the truck bed clamp of the present invention shown in use attaching a cap to a truck bed.
Figure 3:
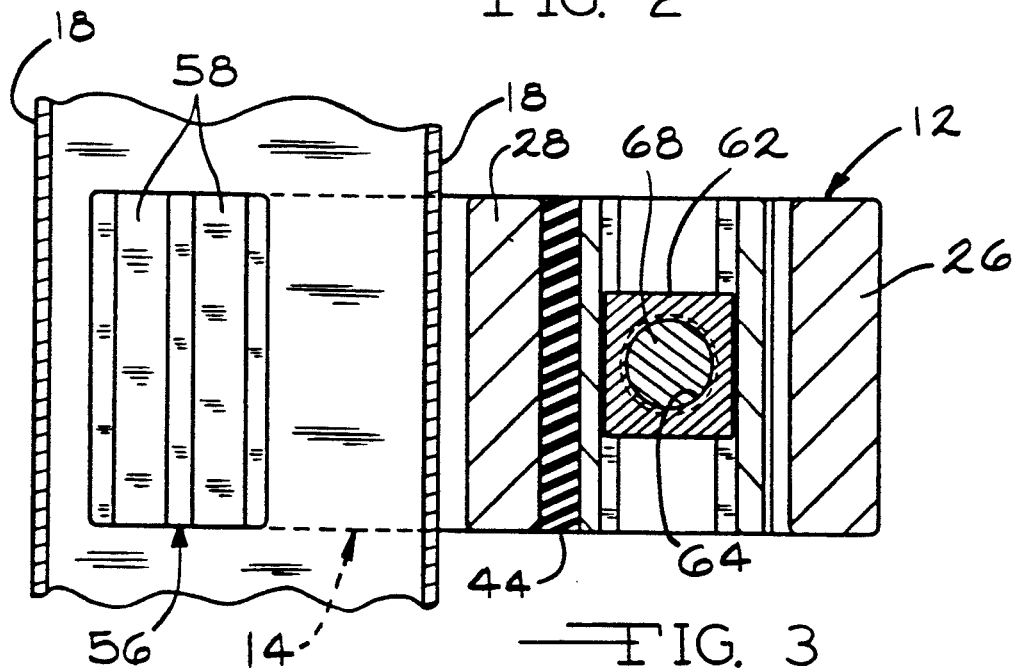
FIG. 3 is a sectional view of the clamp as seen from the line 3—3 of FIG. 1.

Clamp 10 is shown in greater detail in FIGS. 2 and 3 and includes two principal components, a receiving member 12 and a received member 14. The terms "receiving" and "received" will be further described below. The clamp 10 as shown in FIG. 2 is in use securing a truck cap 16 to a truck bed 18. This is accomplished by securing a horizontal lower flange 20 of the cap to a horizontal upper flange 22 of the truck bed with a resilient gasket 24 therebetween.

The received member 14 is generally U-shaped including a base portion 36 and a pair of generally parallel legs 32 and 34 extending therefrom. Leg 32 ends in a clamping pad 56 which faces in the same direction which leg 34 extends from the base portion 36.

The receiving member 12 is generally an F-shaped member having a base portion 30 from which extends a pair of generally parallel legs 26 and 28 The distal end of base portion 30 forms a clamping pad 31 which faces in the direction of extension of the legs 26 and 28 for engagement with one of the two objects being clamped together. The two legs 26 and 28 of the receiving member 12 form a pocket 38 therebetween for receiving the leg 34 of the received member 14. Hence the labels "receiving" and "received" for the two members 12 and 14 respectively.

The two clamping pads 31 and 56 are positioned in confronting juxtaposition relative to one another by insertion of the leg 34 of member 14 into the receiving pocket 38 of the receiving member 12. As the leg 34 is inserted further into the pocket, the two clamping pads 31 and 56 are brought closer together. The spacing between the two clamping pads is determined by the amount of insertion of the leg 34 into the pocket 38. As a result, the length of the shortest leg, leg 28, determines the operating range of the clamp 10.

The received leg 34 is formed near its distal end 40 with a groove 42 into which a bushing 44 is seated. The bushing 44 engages the flat engagement surface 46 of the leg 28. Likewise, the leg 26 of the receiving member includes, at its distal end 48, a groove 50 similar to the groove 42 which mounts a bushing 52. The bushing 52 contacts the flat engagement surface 54 of the leg 34 of the received member. Surface 46 of the leg 28 is parallel to flat engagement surface 54 of the leg 34. As a result, the two clamping pad surfaces remain parallel to one another regardless of the adjusted position of the two clamp members.

The two bushings 44 and 52 are made of ultra-high molecular weight polyethylene which has a low coefficient of friction and which is self-lubricating. This provides smooth operation of the clamp as the two members are moved relative to one another while clamping loads are present. This is in contrast to clamp members engaging in surface to surface engagement where the clamp loads can produce high friction forces at the sliding engagement surfaces.

Clamping pad 56 is formed with a pair of grooves 58 for mounting resilient rubber rods 60 to provide a "no damage" clamping surface. The clamping pad 31 is shown with integral grooves forming the clamping surface but can alternatively be made identical to the clamping pad 56 with rubber rods.

The leg 34 mounts a nut 62 or other insert with a threaded bore 64. The insert is mounted in a manner which prevents rotation of the nut 62 about the axis of its threaded internal bore. The nut can be mounted to the leg 34 by a punching operation, adhesive or the like, or the nut could be free until held by the bolt 68. The receiving member 12 includes a non-threaded bore 66 through the base portion 30 at the closed end of the pocket 38 for passage of a shaft 68 of a bolt 70. The lower portion 72 of the shaft 68 is threaded to enable the bolt to be threadably received by the nut 62. The bolt 70 positions the two clamp members relative to one another to provide the clamping force at the two clamping pads 31 and 56. Clockwise rotation of the bolt 70, as viewed at the bolt head, draws the nut 62 further onto the bolt. This draws the leg 3 further into the pocket 38 and draws the clamping pad 56 of the received member toward the clamping pad 31 of the receiving member.

As the two clamping pads bear against the objects being clamped together, a load is applied to the clamp members 12 and 14 at the clamping pads. This load is carried through the clamp members and a side load is developed at the contact points of the two bushings 44 and 52 with the smooth walls they engage. The side loads balance the internal moments within the clamp members produced by the clamp loads. As the distance between the two clamping pads decreases, the bushings 44 and 52 are moved further away from one another and the magnitude of these side loads is reduced.

By sliding the leg 34 into a pocket with contact points on both sides of the leg 34, the two clamp members will remain aligned with one another upon the application of a clamping load. The side loads produced between the clamp members balance the internal moments such that the bolt 70 will not experience bending loads.

The clamp members 12 and 14 can be made of any of several materials. In a preferred embodiment, they are made from extruded aluminum bars which have been cut to a predetermined thickness. Aluminum has a high strength to weight ratio resulting in a light weight clamp. After cutting, the bore 66 is machined into the receiving member 12 and the nut 62 is secured in the received member 14. The bushings 44 and 52 and the rubber rods 60 are also installed. The use of a steel nut 62 or other threaded steel insert within the aluminum clamp member provides greater clamping strength as compared to forming the screw threads directly in the extruded aluminum. If the added strength of the steel nut is not needed, a threaded bore can be formed directly in received leg 34.

Figure 4:
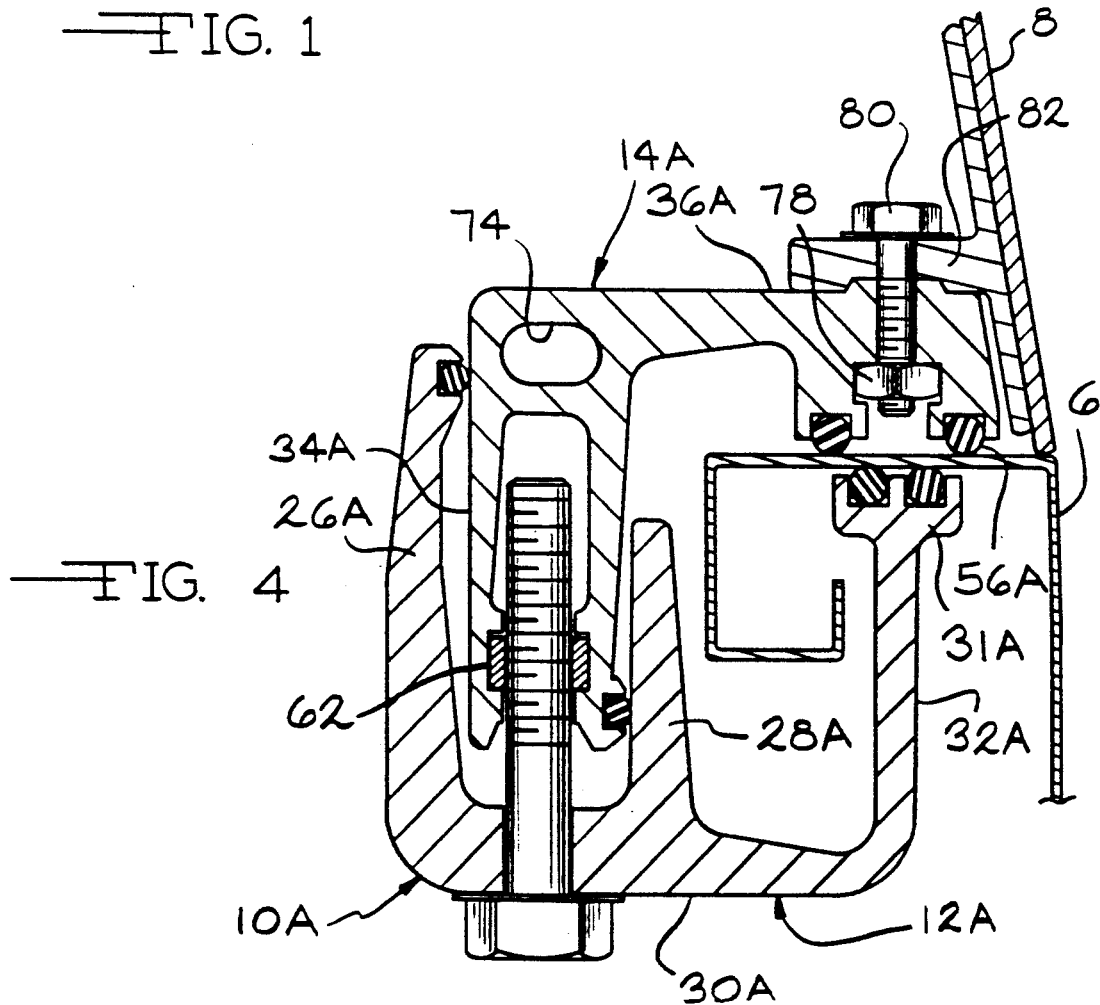
FIG. 4 is a sectional view of an alternative embodiment of the clamp of the present invention.

The received member 14 also includes a lateral passage 74 formed therein which can be used as a tie-down hole for securing objects within the truck bed. Additionally, other attaching features can be formed into the two clamp members for mounting other accessories to the truck bed. An alternative embodiment of the clamp 10 is shown in FIG. 4 and designated as Clamp 10a shows an accessory mount in a clamp member. In clamp 10a, similar elements to elements of clamp 10 have been given the same reference numeral with the suffix "a". The clamp 10a is functionally identical to the clamp 10 described above. The primary difference in the configuration of clamp 10a is that the leg 32 of clamp 10 has been moved from clamp member 14 to clamp member 12a forming a leg 32a. This positions the clamping pad 31a at a distance from the arm or base portion 30a of the number 12a. Conversely, the clamping pad 56a of member 14a is mounted directly to the base portion 36a.

Like the clamp 10, clamp 10a includes a tie down hole 74 to enable objects to be tied to the clamp 10a. In addition, the clamp 10 includes a second nut 78 mounted to the member 14a in a manner that prevents rotation of the nut about the axis of its internally threaded bore. The nut 78 threadably receives a threaded bolt shaft 80 used to attach the cab spoiler 8 to the clamp 10a and thereby attaching the cab spoiler to the truck bed 6. The bolt 80 passes through a horizontal mounting flange 82 on the inside of the cab spoiler 8.

As shown in FIG. 4, the clamp is only used to mount the cab spoiler 8, that is, no other accessory is mounted to the bed 6 between the clamping surfaces of the clamp. If desired, the clamp can also be used to clamp an object or other accessory to the pick-up bed 6 between the two clamping pads 31a and 56a as shown with the clamp 10 of FIGS. 2 and 3.

The clamp of the present invention thus provides numerous features as described above which improve upon previously available truck bed clamps. These features include contact of the received member on both sides of the received leg to eliminate bending stresses in the clamping bolt; low friction bushings at the contact points; a steel nut and bolt for holding the two extruded aluminum clamp members together and the addition of tie down holes or other accessary attachment means to the clamp members.

It is to be understood that the invention is not limited to the exact construction illustrated and described above, but that various changes and modifications may be made without departing from the spirit and scope of the invention as defined in the following claims.

I claim:
1. A clamp comprising:
   a first member having a first clamping surface and a pair of spaced legs extending in a direction generally normal to said first clamping surface and being laterally offset from said first clamping surface, said pair of spaced legs forming a receiving pocket therebetween closed at one end and having a longitudinal axis generally normal to said first clamping surface;

a second member having a second clamping surface and a single leg extending in a direction generally normal to said second clamping surface, said single leg being laterally offset from said second clamping surface and said second leg being insertable into said receiving pocket formed in said first member, whereby said clamping surfaces are oppositely positioned from each other when said single leg is inserted into said receiving pocket;

means forming contact between said single leg and each leg of said pair of legs forming said receiving pocket to maintain alignment of said second member relative to said first member; and threaded fastener means extending between said first and second members to couple said members together and constituting means upon rotation for moving said single leg relative to said pair of legs to alter the spacing between said clamping surfaces and to hold said clamping surfaces in desired positions relative to one another whereby said clamp can be used to attach two or more objects together between said clamping surfaces or said clamp can be mounted to a single object positioned between said clamping surfaces.

2. The clamp of claim 1 wherein said means forming contact between said single leg and each leg of said pair of legs forming said receiving pocket forms a single point of contact between said single leg and each leg of said pair of legs.

3. The clamp of claim 1 further comprising:
mounting means formed in one of said members for attaching an accessory item to said clamp separate from those objects attached to said clamp between said clamping surfaces.

4. The clamp of claim 3 wherein said mounting means includes means forming an internally threaded bore for threaded engagement with a bolt for attaching an accessory item to said clamp.

5. The clamp of claim 4 wherein said means forming an internally threaded bore includes a nut having a threaded bore therethrough mounted to one of said members in a manner to prevent rotation of said nut about the axis of said bore for reception of a bolt for attaching an accessory item to said clamp.

6. A clamp comprising:
a first member having a first base portion with a pair of spaced legs extending therefrom in one direction and a first clamping surface facing in the direction which said pair of legs extend from said first base portion, said first clamping surface being laterally offset from said pair of legs and said pair of legs forming a receiving pocket therebetween closed at one end by said first base portion;

a second member having a second base portion with a third leg extending therefrom and a second clamping surface facing in the direction which said third leg extends from said second base portion, said second clamping surface being laterally offset from said third leg and said clamping surfaces being positioned in confronting juxtaposition when said third leg is received in said pocket of said first member;

means operatively associated with said legs for forming contact between said third leg and each of said pair of legs to maintain alignment of said second member relative to said first member; and said first member having a bore extending through said first base portion thereof between said pair of legs and a bolt extending through said bore into said receiving pocket, said third leg having first means forming an internally threaded bore for threaded engagement with said bolt for relative positioning of said first and second members.

7. The clamp of claim 6 wherein said means forming an internally threaded bore in said second member includes a steel member having a threaded bore therethrough mounted to said second member in a manner to prevent rotation of said steel member about the axis of said threaded bore.

8. The clamp of claim 6 wherein said means operatively associated with said legs for forming contact between said third leg and each of said pair of legs forms a single point of contact between said third leg and each of said pair of legs forming said receiving pocket.

9. The clamp of claim 6 wherein said means for forming contact between said third leg and each of said pair of legs includes low friction bushings.

10. The clamp of claim 9 wherein said bushings are made of ultra-high molecular weight polyethylene.

11. The clamp of claim 6 wherein said pair of legs includes a first leg and a second leg with said first leg being positioned between said first clamping surface and said second leg, said first leg having a flat engagement surface defining a portion of said receiving pocket and along which said third leg moves, said third leg having a flat engagement surface generally parallel to said flat engagement surface of said first leg and along which said second leg moves, said second leg having means thereon for forming single point contact for engagement with said flat engagement surface of said third leg and said third leg having means thereon for forming single point contact for engagement with said flat engagement surface of said first leg.

12. The clamp of claim 11 wherein said means forming single point contact includes a low friction bushing mounted to said second leg for contact with said flat engagement surface of said third leg and a low friction bushing mounted to said third leg for contact with said flat engagement surface of said first leg.

13. The clamp of claim 12 wherein said bushings are mounted to said legs at distal ends thereof.

14. The clamp of claim 6 wherein at least one of said clamping surfaces is formed with a resilient insert to avoid damage to objects clamped therebetween.

15. The clamp of claim 6 further comprising:
mounting means for attaching objects to one of said members other than between said clamping surfaces.

16. The clamp of claim 15 wherein said mounting means includes a through hole forming a tie down hole.

17. The clamp of claim 15 wherein said mounting means includes second means forming an internally threaded bore for threaded engagement with a bolt for attaching an accessory item to said clamp.

18. The clamp of claim 17 wherein said second means forming an internally threaded bore includes a nut having a threaded bore therethrough mounted to one of said members in a manner to prevent rotation of said nut about the axis of said bore for reception of a bolt for attaching an accessory item to said clamp.

19. A clamp comprising:

a first member having a first base portion with first and second spaced legs extending therefrom in one direction and a first clamping surface facing in the direction which said first and second legs extend from said first base portion, said first clamping surface being laterally offset from said first and second legs and said first leg being positioned between said first clamping surface and said second leg, said first and second legs forming a receiving pocket therebetween closed at one end by said first base portion and said first leg having a flat engagement surface forming a surface of said pocket, said receiving pocket having a longitudinal axis extending in the direction of said first legs;

a second member having a second base portion with a third leg extending therefrom and a second clamping surface facing in the direction which said third leg extends from said second base portion, said second clamping surface being laterally offset from said third leg, said first and second clamping surfaces being positioned in confronting juxtaposition when said third leg is received in said pocket of said first member and said third leg having a flat engagement surface facing said second leg and being parallel to the flat engagement surface of said first leg;

a bushing mounted to a distal end of said third leg for engagement with said flat engagement surface of said first leg to form point contact therebetween and a bushing mounted to a distal end of said second leg for engagement with said flat engagement surface of said third leg to form point contact therebetween; and said first member having a bore extending through said first base portion thereof between said first and second legs and a bolt extending through said bore into said receiving pocket along said longitudinal axis, said third leg having means forming an internally threaded bore for threaded engagement with said bolt to join said first and second members together and for relative positioning of said first and second members.

20. The clamp of claim 18 wherein said means forming an internally threaded bore in said second member includes a steel member having a threaded bore therethrough mounted to said second member in a manner to prevent rotation of said steel member about the axis of said threaded bore.

21. A clamp for mounting accessories to the cargo box of a vehicle, said cargo box having a vertical side wall terminating in an upper end, said clamp comprising:

a first clamp member having a first base portion with a pair of spaced legs extending therefrom in one direction and a first clamping surface for engagement with said side wall upper end, said first clamping surface facing in the direction which said pair of legs extend from said first base portion, said first clamping surface being laterally offset from said pair of legs and said pair of legs forming a receiving pocket therebetween closed at one end by said first base portion;

a second clamp member having a second base portion with a third leg extension therefrom and a second clamping surface for engagement with said side wall upper end, said second clamping surface facing in the direction which said third leg extends from said second base portion, said second clamping surface being laterally offset from said third leg;

means for holding said first and second clamp members in position relative to one another with said third leg being received in said pocket of said first clamp member and said first and second clamping surfaces being positioned in confronting juxtaposition on opposite sides of the upper end of said side wall to mount said clamp to said side wall upper end;

means operatively associated with said legs for forming contact between said third leg and each of said pair of legs to maintain alignment of said second clamp member relative to said first clamp member; and means for attaching an accessory to one of said clamp members whereby said accessory is mounted to said side wall.

22. The clamp of claim 21 wherein said clamp has an upper end and said means for attaching an accessory to one of said clamp members attaches the accessory to the upper end of said clamp.

23. The clamp of claim 21 wherein said means for attaching an accessory to one of said clamp members includes a bore in one of said clamp members for reception of a fastener to attach the accessory to the side wall.

24. The clamp of claim 23 wherein said bore is contained within a nut carried by one of said clamp members.

25. The clamp of claim 21 wherein the upper end of the cargo box includes a horizontal upper flange extending into the cargo box from the vertical side wall and wherein said first and second clamping surfaces engage opposite sides of the horizontal upper flange of the side wall upper end.

26. The clamp of claim 21 wherein the upper end of the cargo box includes a horizontal upper flange extending into the cargo box from the vertical side wall and a down turned inner flange depending from the upper flange and wherein said first and second clamping surfaces engage opposite sides of the down turned inner flange of the side wall upper end.

27. The clamp of claim 21 wherein:

said first clamp member has a bore extending through said first base portion thereof between said pair of legs and a bolt extending through said bore into said receiving pocket, said third leg having first means forming an internally threaded bore for threaded engagement with said bolt for relative positioning of said first and second clamp members.

* * * * *